United States Patent [19]

Ray

[11] Patent Number: 5,040,549
[45] Date of Patent: Aug. 20, 1991

[54] CONVEYORS PARTICULARLY FOR CUTTING MACHINES

[75] Inventor: Eric T. Ray, Salisbury, England

[73] Assignee: GBE International PLC, England

[21] Appl. No.: 460,141

[22] PCT Filed: May 31, 1989

[86] PCT No.: PCT/GB89/00598
§ 371 Date: Mar. 23, 1990
§ 102(e) Date: Mar. 23, 1990

[87] PCT Pub. No.: WO89/11804
PCT Pub. Date: Dec. 14, 1989

[30] Foreign Application Priority Data

Jun. 3, 1988 [GB] United Kingdom ............... 8813196

[51] Int. Cl.5 ............................................. A24C 1/02
[52] U.S. Cl. ................................. 131/117; 131/118; 198/841; 198/860.1
[58] Field of Search .................. 131/116, 117, 118; 198/841, 860.1

[56] References Cited

U.S. PATENT DOCUMENTS 4,724,953  2/1988  Winchester ..................... 198/841

Primary Examiner—V. Millin
Assistant Examiner—L. Reichard
Attorney, Agent, or Firm—Dowell & Dowell

[57] ABSTRACT

The invention provides a belt conveyor (34), particularly for feeding tobacco or similar material in a cutting machine, comprising a conveyor belt (10) formed of pivotally linked transverse slats and arranged around and between a drive roller (14) and an idler roller (15) to provide an upper and a lower run of the belt; further comprising a support plate (13) positioned immediately below and extending over substantially the whole area of the upper run of the belt, said plate having a series of apertures (16, 18) therein through which particulate material falling through the conveyor belt may fall or be swept, and means (20, 21) below the plate to collect such particulate material and remove it from the interior of the conveyor.

9 Claims, 4 Drawing Sheets

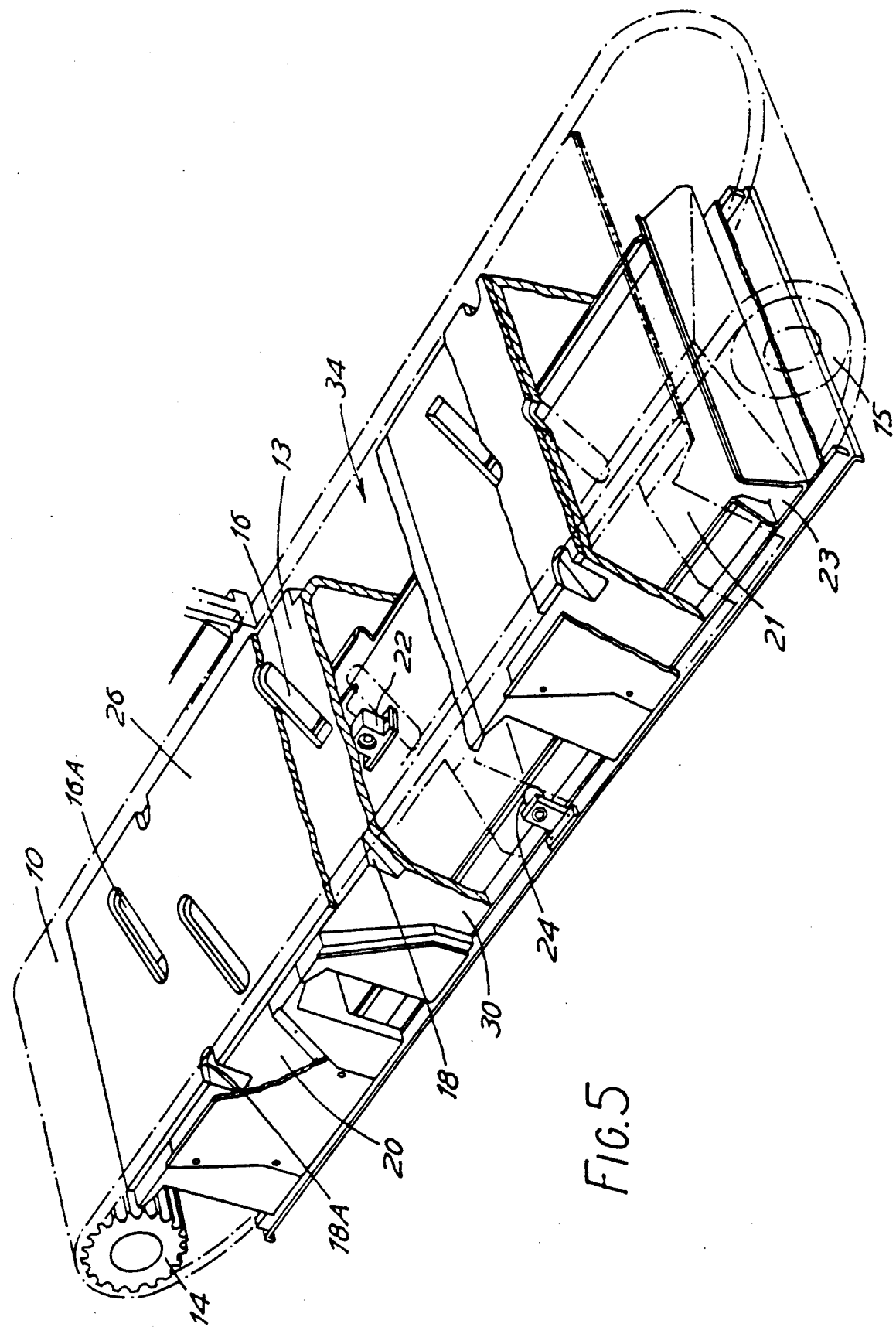

CONVEYORS PARTICULARLY FOR CUTTING MACHINES

This invention relates to an improvement in conveyors for cutting machines which are particularly but not solely for cutting or shredding tobacco.

The type of machine to which the invention might be used for cutting the tobacco is of a well known type per se in which the tobacco leaf is fed into a convergent throat or rectangular cross section formed by two parallel plates and two converging conveyor belts. At the convergent end of the throat is a mouthpiece. The tobacco leaf to be cut is fed into the throat at the large or entry end and is driven by the conveyor belts towards and through the mouthpiece. The leaf is out as it issues from the mouthpiece either by a single knife caused to reciprocate across the mouthpiece or by one or more rotary knives arranged in a outer drum which rotates on an axis either transverse or parallel to the width of the throat, so that the cutting edge of the knife or knives is caused to pass across the mouthpiece The convergence of the throat compresses the leaf sufficiently so that t may be cut and not pulled from the mouthpiece. One of the two conveyors usually the upper, is free to move and force is applied to it so that the degree of compression of the leaf can be regulated.

The cutting machines of this kind are described for example in United Kingdom Patents Nos. 1195163 1067442, 1494439 and 1498667.

The conveyor belts, particularly the lower one. comprise a series of pivotally connected transverse slats which pass over a toothed drive roller and an idler roller. A problem has occurred with such conveyors because particles of tobacco gravitate through the spaces between the slats and clog the inside of the conveyor mechanism and particularly the spaces between the teeth of the drive roller and thus impede the smooth running of the conveyor belt.

An object of the present invention is to overcome this problem.

Accordingly the present invention provides a belt conveyor particularly for feeding particulate material in a cutting machine, comprising a conveyor belt, a drive roller and an idler roller said conveyor belt being formed of pivotally linked transverse slats and arranged around and between the drive roller and the idler roller to provide an upper and a lower run of the belt further comprising a support plate positioned immediately below and extending over substantially the whole area of the upper run of the belt, said plate having a series of apertures therein through which particulate material falling through the conveyor belt may fall or be swept, which apertures are in the form of transverse slots which each extend over a portion of the width of the conveyor from a point inside a side edge of the plate, and means below the plate to collect such particulate material and remove it from the interior of the conveyor In order to promote a full understanding of the above and other aspects of the present invention an embodiment will now be described, by way of example only with reference to the accompanying drawings in which:

FIG. 5 is a perspective view of the conveyor of FIGS. 3 and 4.

Figure 1:
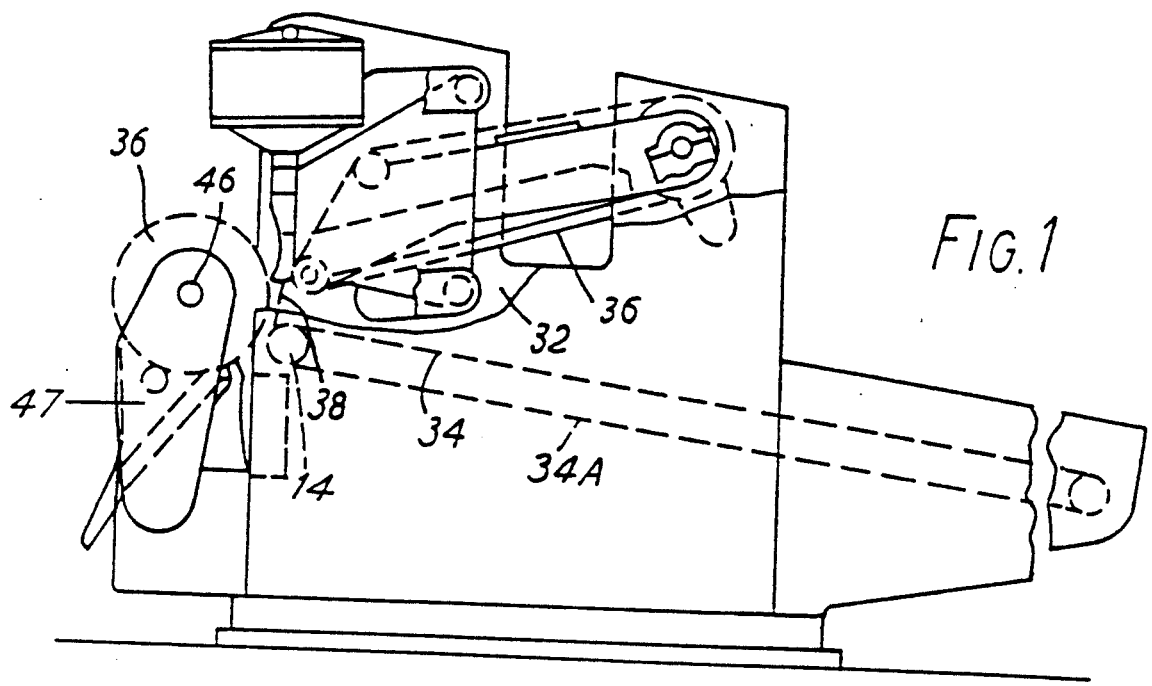
FIG. 1 is a side view of a typical tobacco cutting machine to which the invention may be applied.
Figure 2:
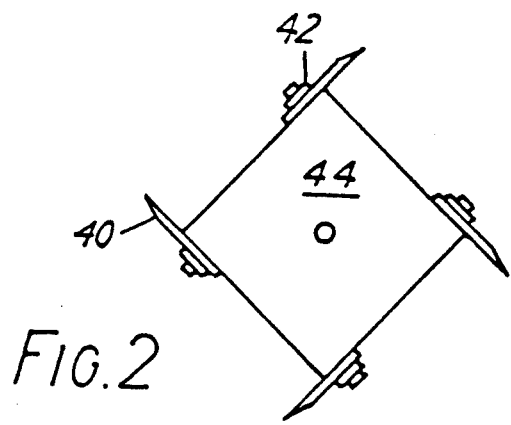
FIG. 2 is a view oF the rotary cutter of the machine of FIG. 1.

In the rotary machine as shown in FIGS. 1 and 2 which is of known type per se, tobacco is fed onto a space 32 between two converging conveyors 34 and 36 which carry the tobacco from the space 32 to a mouthpiece 38 and at the same time compress it so that it is driven through the mouthpiece as a plug of tobacco. As the plug emerges it is shredded by a series of knives 40 carried in holders 42 in bearings carried by arms 47. The cutting edges of the knives all lie on an imaginary cylindrical surface; and may be sharpened by a continuous grinding operation in known manner by means of a grinding wheel (not shown) which is remote from the cutting position and has a drive mechanism for traversing it parallel to the axis of the drum.

Figure 3:
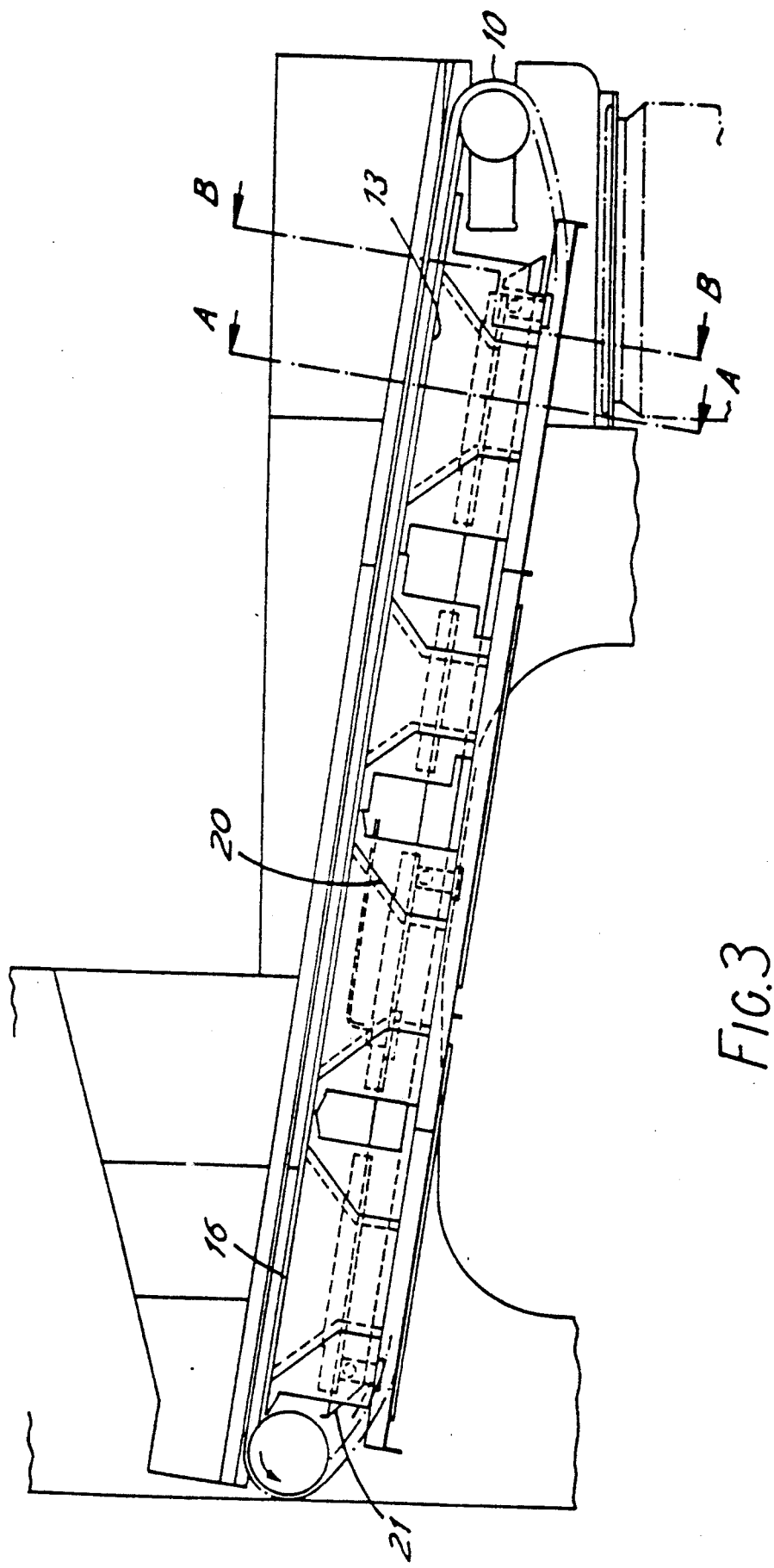
FIG. 3 is a schematic side elevation of the lower conveyor of the machine of FIG. 1 arranged in accordance with the invention.
Figure 4:
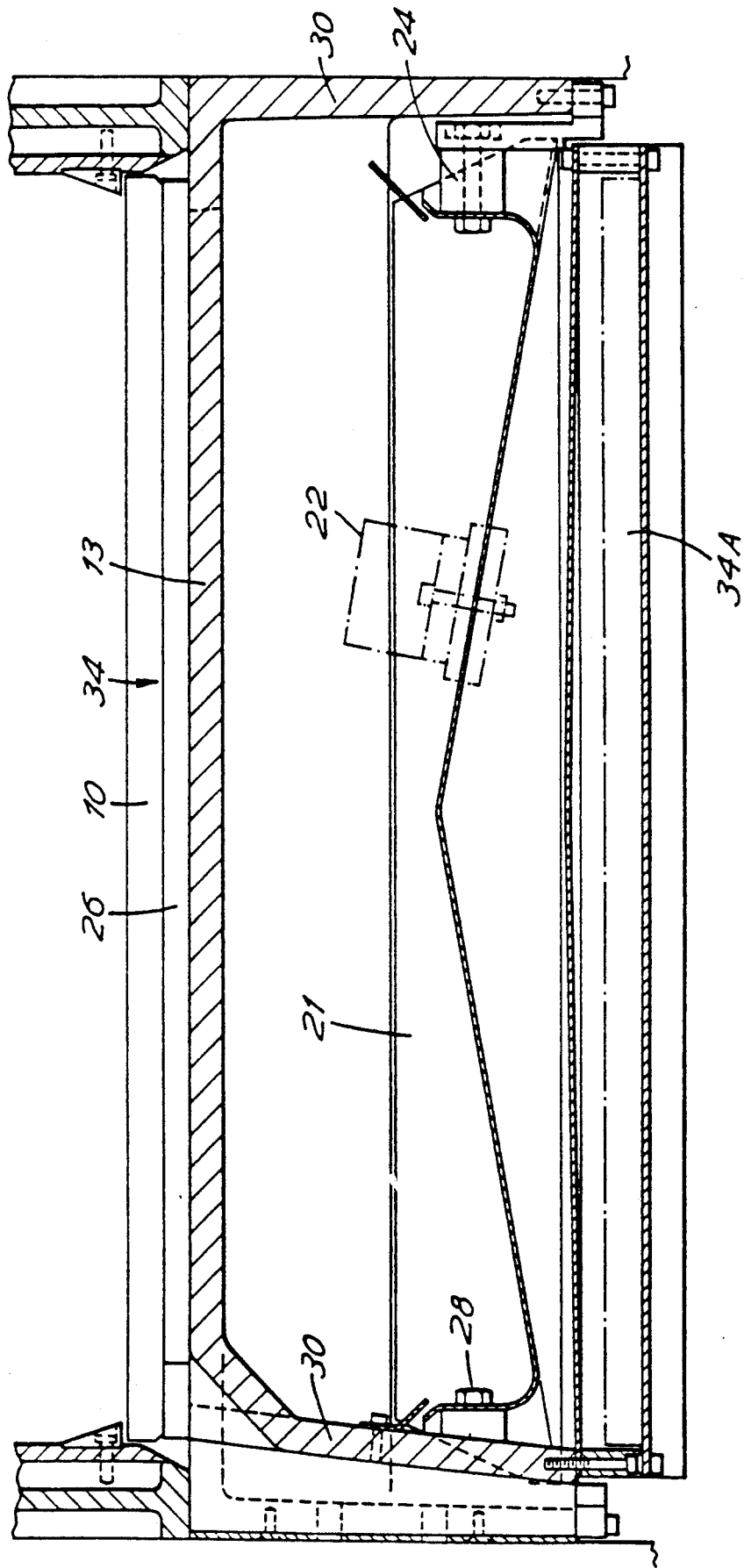
FIG. 4 is a schematic cross sectional view, the left hand half of which is taken on the plane A-A on FIG. 3 and the right hand half of which is taken on the plane BB on FIG. 3.

The lower conveyor 34 of the two conveyors is shown in more detail in FIGS. 3, 4 and 5 of the drawings Shown in FIG. 3 the conveyor belt 10 of the lower conveyor 34 is made of transverse slats pivoted together, as shown in U.K. Patent 1494439 and this leaves small gaps between adjacent slats through which small particles of tobacco, or other material on the conveyor can fall. The belt 10 passes around a toothed roller 14 at its discharge end, which drives the belt; and around an idler roller 15 at the opposite or entry end of the conveyor 34.

Arranged below the upper run of the conveyor belt 10 is a plate 13 which is formed with slots 16 (FIG. 5) arranged at an acute angle to the direction of movement of the upper run of the conveyor belt 10. These slots 16 are offset from each other so that together they extend across almost the entire width of the plate 13 without however breaking through the edges of the plate. The side edges of the plate are formed with notches 18 leading to chutes 20 formed in side plates 30 which with the plate 13 form the chassis of the conveyor 34.

Beneath the plate 13 and above the lower run of the conveyor 34 is a tray 21 which is arranged to be vibrated by a motor 22 driving an eccentric weight or by pneumatic means. The tray 21 is mounted on flexible mountings as indicated at 24 to allow such vibration. The tray 21 may be inclined towards the entry end of the conveyor 34, where the 'ray 21 has an outlet chute 23.

Between the upper run of the conveyor belt 10 and the plate 13 there is a wear strip 26 made of synthetic plastics material which has slots 16A and notches 18A corresponding to the slots 16 and the openings 18 in the plate 13.

Other means such as supports, guides and driving devices are not described as these may be of conventional construction.

The tobacco or other material to be cut is fed on to the belt 10 of the conveyor 34, and as it travels along any small particles of the material which gravitate through the belt 10 fall through the slots 16A, 16 in the wear strip 26 and the plate 13, to fall on to the tray 21 which on vibration transfers them to the outlet opening 21 where they may be collected. In practice, the tray 21 need only be vibrated periodically, such as 5 seconds in every 5 minutes to keep the tray clear. Material falling through the belt 10 is carried along over the surface of the wear plate 26 until it reaches the next slot to fall through it.

Further, in operation, since small particles will fall over the side edges of the belt 10 and through the narrow strips of the belt 10 on either side of the belt which are not covered by the scope of the slots 16, 16A. Such material falls directly into the chute 20 and through the notches 18 into the chutes 20 respectively. Means, not shown may be provided to collect material falling from the opening 23 and from the chutes 20

Thus it can be seen that the interior of the conveyor, and thus the mechanism of it, is protected from particles of material falling out of the tobacco leaves being compressed and cut, through or over the edges of the conveyor belt.

I claim:

1. A belt conveyor, particularly for feeding particulate material in a cutting machine, comprising a conveyor belt, a drive roller and an idler roller, said conveyor belt being formed of pivotally linked transverse slats and arranged around and between the drive roller and the idler roller to provide an upper and a lower run of the belt; further comprising a support plate positioned immediately below and extending over substantially the whole area of the upper run of the belt, said plate having a series of apertures therein through which particulate material falling through the conveyor bent may fall or be swept, which apertures are in the form of transverse slots which each extend over a portion of the width of the conveyor from a point inside a side edge of the plate, and means below the plate to collect such particulate material and remove it from the interior of the conveyor.

2. A conveyor according to claim 1, in which said slots are at an acute angle to the direction of travel to said upper run of the belt.

3. A conveyor according to claim 2, in which said slots extend alternately from inside one side of the other along the length of the upper run of the conveyor.

4. A conveyor according to claim 3, in which said apertures include notches spaced along each side edge of said plate which cover that part of the belt along each side edge which is not covered by the slots.

5. A conveyor according to claim 4, in which downward chutes are provided spaced along each side of the upper run of the conveyor, the open top faces of which cover substantially the whole length of the respective side of the upper run of the belt to catch any particulate material which falls over the edges of the belt.

6. A conveyor according to claim 5, in which said notches each communicate with a respective one of said chutes.

7. A conveyor according to claim 1, in which collection means comprises a tray disposed beneath said plate.

8. A conveyor according to claim 7, in which said tray is mounted in the conveyor by means of flexible mountings and means is provided to vibrate the tray to cause material collected therein to migrate to an outlet from the tray.

9. A conveyor according to claim 1, wherein said plate is provided with a synthetic plastics material wear strip between it and the upper run of the belt and the wear strip has matching apertures corresponding to those in the plate.

* * * * *